Feb. 22, 1927.　　　　　　　　E. J. PRINDLE　　　　　　　1,618,387
ROLL FILM HOLDER FOR CAMERAS
Filed Feb. 18, 1924　　　6 Sheets-Sheet 1

INVENTOR
Edwin J. Prindle
BY
Prindle, Wright, Ned & Beau
ATTORNEYS

Feb. 22, 1927. 1,618,387
E. J. PRINDLE
ROLL FILM HOLDER FOR CAMERAS
Filed Feb. 18, 1924  6 Sheets-Sheet 2

INVENTOR
Edwin J. Prindle,
BY
Prindle, Wright, Neel & Bean
ATTORNEYS.

Feb. 22, 1927.

E. J. PRINDLE

1,618,387

ROLL FILM HOLDER FOR CAMERAS

Filed Feb. 18, 1924    6 Sheets-Sheet 3

INVENTOR
BY
ATTORNEYS

Feb. 22, 1927.

E. J. PRINDLE

1,618,387

ROLL FILM HOLDER FOR CAMERAS

Filed Feb. 18, 1924   6 Sheets-Sheet 4

Patented Feb. 22, 1927.

1,618,387

UNITED STATES PATENT OFFICE.

EDWIN J. PRINDLE, OF SOUTH ORANGE, NEW JERSEY.

ROLL-FILM HOLDER FOR CAMERAS.

Application filed February 18, 1924. Serial No. 693,432.

The object of my invention has been to provide a roll film holder for cameras using film in rolls, in which the operation of placing a new film in the camera shall be greatly simplified and shortened without loss of efficiency, and to such ends my invention consists in the roll film holder for cameras hereinafter described.

In loading cameras with roll films, as such cameras are ordinarily constructed, only one of the two stations for receiving spools is provided with winding mechanism, and it is because to provide both stations with winding mechanism has, as heretofore attempted, involved difficulties which either permitted the making of mistakes in winding the wrong spool when attempting to feed an unexposed portion of the film into position for taking a picture, or failing to keep the film flat so as to form an optically correct surface, or otherwise failing to effect an efficient and orderly exposure. My invention overcomes these difficulties and simplifies the operation of loading the camera, so that a new roll of film need only be introduced into whichever spool station of the camera is empty, and can be threaded into the empty spool which always remains in the other station as a result of the preceding operation; and this without fear of mistake in feeding the film after the camera is closed.

While I have chosen the best embodiment of my invention known to me with which to illustrate the spirit of that invention, my invention is capable of embodiment in many different forms, and the invention is therefore not to be confined to the illustrated form beyond the necessary intendment of the claims.

In the illustrated embodiment, the roll film holder (Figs. 1 and 2) is provided with two roll stations, 1 and 2, having on the lower side studs 3 and 4, respectively, for forming bearings for one end of the film spools in the usual manner, said studs carrying flanges $3^a$ and $4^a$ so that they may be retracted for the removal of the spools and advanced to engage the spools. At the top of each spool station, there is mechanism by which the spool may be engaged and manually turned for winding the film thereon. I desire to construct each of such mechanisms so that the said winding mechanism at the station occupied by the fresh spool shall not only be disengaged to permit the said spool to unwind under the action of the opposite winding mechanism, but also so that the said first-mentioned winding mechanism shall be rendered incapable of being turned until it is to be used to unwind a fresh spool later placed in the other spool position. In the present instance, the said winding mechanism at the left-hand station, as seen in Figs. 1 to 6, is constructed as follows:

Attached to or forming a part of the body of the camera or film holder are plates 5 and 6, respectively, having holes 7 and 8 which are concentric with the position which it is desired to have the axis of the spool occupy. In the hole 7 is placed a cup-shaped part 7a in which is mounted an inner cylindrical sleeve 9 having a concentric hole in which a rod 10 is mounted that carries at its lower end the usual plate 11 for engagement with a slot in the upper end of the spool for turning the spool. The winding handle 12 is mounted on a plate 13 that is riveted, or otherwise secured, to the upper end of the sleeve 14, which sleeve is mounted upon but keyed to the inner sleeve 9. The rod 10 is provided with a head 15 of sufficient diameter to rest upon the end of the sleeve 14. By this construction the plate 11 can be withdrawn from the slot in the spool by raising the handle, and yet, because of the key-and-slot connection between the two sleeves, the handle and the inner sleeve 9 will always be rotatably connected. I desire to be able to rotatively connect and disconnect the handle 12 from the plate 11, and for that purpose the lower end of the inner sleeve 9 is provided with teeth 16 which are adapted to engage a corresponding series of teeth 17 that are formed on a sleeve 18 that is mounted in a cup-shaped part 8a that is seated in the hole 8 in the lower plate 6. The rod 10 also passes through the sleeve 18. The latter sleeve is provided with a slot 19 that rotatively engages the plate 11 with the said sleeve while permitting the plate to be raised and lowered with the handle 12. The sleeve 18 is also provided with a flange 20 that is adapted to rest against the inner side of the cup-shaped part 8a, and a spiral spring 21 is interposed between the plate 11 and the said flange, so that, while the plate 11 can be raised and lowered, the sleeve 18 will be held with its flange against the inner side of the cup-shaped part 8a, and the sleeve 14 will normally be held against the inner side of the cup-shaped part 7a. The sleeves 9 and 18, with their respective sets of teeth form in effect a clutch by which the handle 12 may be rotatively engaged with or disengaged from the plate 11 respectively by sliding the sleeve 9 up or down without changing the vertical relations of any of the other parts. Likewise, the handle 12 and plate 11 may be raised (Fig. 6) and lowered without destroying the vertical relation of the clutch members; i. e. without causing them to change from a condition of engagement to one of disengagement, or vice versa. The sleeve 9 is provided with a series of teeth 22 that, in the upper position, are adapted to engage a corresponding series of teeth 23 that are formed on the cup-shaped member 7a. Thus, when the sleeve 9 is raised to disengage the clutch teeth, the teeth 22 on the said sleeve engage the teeth 23 and lock the sleeve from rotation. This also, through the key-and-slot connection between the sleeves 9 and 14, locks the handle 12 from rotation. In order to raise and lower the sleeve 9 to connect and disconnect the clutch, the said sleeve is engaged with a leaf spring 24, by being mounted in a hole therein, the spring being confined between a flange on the sleeve and an annular ratchet wheel 25 that is fastened on the sleeve, as by being driven thereon. The spring 24 is provided with pawls 26 and 27 that are adapted to engage the teeth on the ratchet wheel, so that a spool which is engaged by the plate 11 may only be wound in the proper direction to wind up fresh film from a full spool in the opposite spool station and cannot be turned in the opposite direction.

In order to prevent mistakes, it is necessary that the winding mechanism at one spool station be interlocked with the corresponding mechanism at the other spool station, so that the winding mechanism where the fresh spool has been introduced will be disconnected and will not prevent or retard the unwinding of that spool under the pull of the opposite mechanism, but also so that the said first-mentioned winding mechanism cannot be turned at all. The purpose of the latter is to prevent confusing the person using the camera as to which of the two winding mechanisms he should turn, and thus to save making double exposures. For this purpose, the following inter-locking mechanism is provided between the two winding stations.

The spring 24 may be continuous from one winding mechanism to the other, so that only a single spring need be used. It is necessary in this particular embodiment to provide mechanism that shall raise that end of the spring 24 which is at the fresh spool station, so as to disconnect the clutch, and at the same time to lower that end of the said spring which is at the empty spool station, so as to connect the clutch. This I accomplish by providing a plate or disk 28 that is pivoted through the said spring and midway between the two winding mechanisms and that has on its under side two cams, respectively 29 and 30, the cam 29 being adapted to depress the left-hand end of the spring 24 upon rotation of the disk, and the cam 30 being adapted to depress the right-hand end of the said spring when the disk is rotated to bring it over the said spring.

I desire to utilize the motion of the fresh spool in being introduced into the camera, for so rotating the disk 28 that the adjacent end of the spring 24, will be elevated to disconnect the clutch and lock the handle from rotation while the opposite end of the spring will be depressed to engage the clutch and unlock the handle at that end, so that the latter will be free to rotate. I therefore pivot a lever 31 on a pin 32 on the frame of the camera, in such a position that its arm 31ª will be engaged, either by the flange on the spool or, if desired, by a portion of the roll of film on the spool. In the latter case, the lever should be so positioned that it will only engage the roll of film close to the flange, since the pressure of the lever on the film might result in blackening the film where the pressure occurs when it is developed. By placing the lever 31ª so that it engages the film only close to the flange, little harm will be done, since that portion of the film is usually covered by the flange of the printing frame. The opposite arm 31ᵇ of the lever 31 is provided with a pivoted nose 31ᶜ, the nose and lever having co-acting shoulders, so that the nose can yield upward, as seen in the Figures of the drawings, but cannot yield downward relative to the lever. A spring 31ᵈ holds the nose so that the said shoulders will normally be in contact. A spring 31ᵉ tends to hold the outer arm 31ª of the lever 31 in a forward position, so that it can be pushed back by movement of the spool in being inserted into position in the station. This action of the spring also tends to hold the pivoted nose 31ᶜ to the rear of a lug 38 which is so placed on the disk 28 that when the said pivoted nose is swung forward by the action of the spool in swinging the arm 31ª backward, the lug 38 will be carried forward with the pivoted nose and will rotate the disk and swing its cam 29 over the spring 24 to depress the latter. When the spool is removed from its station, the arm 31ª will be swung forward by the spring 31ᵉ against a pin or lug 31ᶠ on the frame, the pivoted nose 31ᶜ being permitted to turn on its pivot and ride idly over the pin 38 in order to get behind the same so that at the proper time it will again move the said pin forward and shift the disk with its cam.

At the right-hand spool station is a lever 33 which is constructed precisely like the lever 31, except that it lies in the opposite direction, and its parts have therefore been numbered the same as those of the left-hand mechanism previously described, except that the numerals have been primed, and do not need to be further described. The disk 28 is also provided with a pin 34 that is adapted to engage a hump 35 on the spring 36, whose ends are secured to the frame, as by pins 37. Thus, when the disk 28 is being rotated, the hump is moved upward by the pin 34 until the latter passes over the crest of the hump, when the reaction of the spring will throw the hump downward and throw the pin 34 to the right (for instance) far enough so that the levers 31 and 33 are relieved of pressure by lugs 38 and 39 on a disk with which they co-act.

Figure 10:
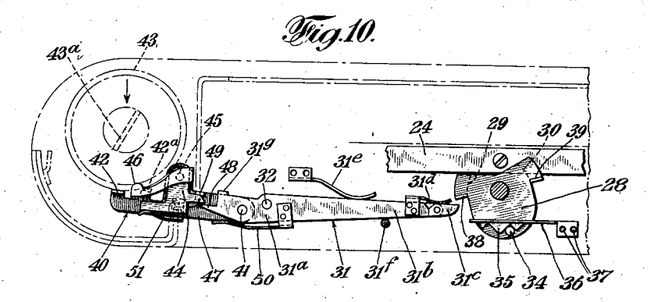
Figure 19:
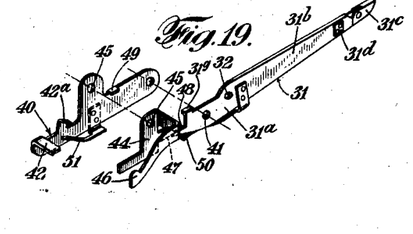
Fig. 19 is a perspective view of the parts for detecting an empty spool.
Figure 20:
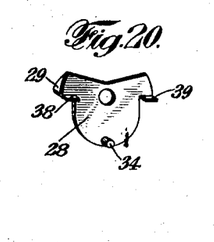
Figs. 20 and 21 are perspective top and bottom views of the cam that is operated by the parts in Fig. 19 for controlling the winding mechanism.
Figure 21:
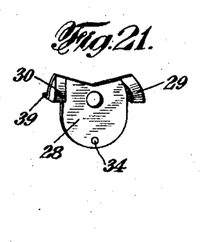

While my mechanism may be constructed so that the lever 31 and the corresponding lever 33 at the other spool station are directly engaged by the flange or the film on a new spool, as it is being inserted into the camera, such construction has the limitation that, where the lever is engaged by the flange of the spool, the mechanism can make no distinction between a full spool and one having no film upon it, and, where said lever engages the film, the power to shift the said lever is derived by reaction from the pressure of the film itself against the lever. As it is possible that such pressure might injure the image portion of the film and cause it to turn black upon development, I preferably use the special form of mechanism which is illustrated in the drawings, in which the first contact of the loaded spool is with an easily movable part, or trigger, which is merely touched by the film, if it be present, and which, when so touched, locks a part to the lever, which part is in position to be engaged by the flange. This results in the power to move the lever being taken from the flange and not from reaction from pressure on the film, thus saving the latter from injury. The illustrated embodiment of the said device is constructed as follows:

A finger 40 (shown in perspective in Fig. 19) is pivoted at 41 upon the lever arm 31ª and the outer end of the finger is provided with a vertical lip 42 of sufficiently vertical height to insure that the flange 43 of the spool will engage it as the spool is introduced into the camera. A trigger 44 (shown in perspective in Fig. 19) is pivoted at 45 upon the finger 40 and has a toe 46 which extends toward the spool and is positioned at a level below the flange 43, so that when the trigger is rocked down, as seen in Fig. 10, the said toe is so far in advance of the lip 42 that if the spool be loaded with film, the film will engage the said toe before the flange 43 engages the lip 42. The trigger is provided with a heel 47 so that when the trigger is swung down, as seen in Fig. 10, by the presence of film on the spool, the said heel will be in position to engage a projection or shoulder 48 that is formed on the lever 31. A pin, or other shoulder, 49 is preferably formed on the finger 40 to form a stop for the heel 47, and is placed sufficiently far from the pivot 41 of the finger so that it will not itself engage the shoulder 48 on the lever if the finger be swung backward when not locked to the lever. A spring 50 on the lever arm 31ª tends to hold the finger 40 in line with the lever and against a lug 31ᵍ on the lever. A spring 51 on the finger tends to hold the trigger in position against a lug 42ª in which it projects forward of the lip 42. The spring 50 is made stronger than the spring 51, so that the trigger will be moved by the film before the finger will move. The trigger mechanism at the opposite spool station from that described is the same as that just described, except that the parts project in the opposite direction, and the reference numerals of the corresponding parts are therefore made the same except that they are primed.

The spools used in my camera are preferably provided at both ends both with slots 43ª for the plates 11 and with holes 43ᵇ for the studs 3 and 4.

Figure 15:
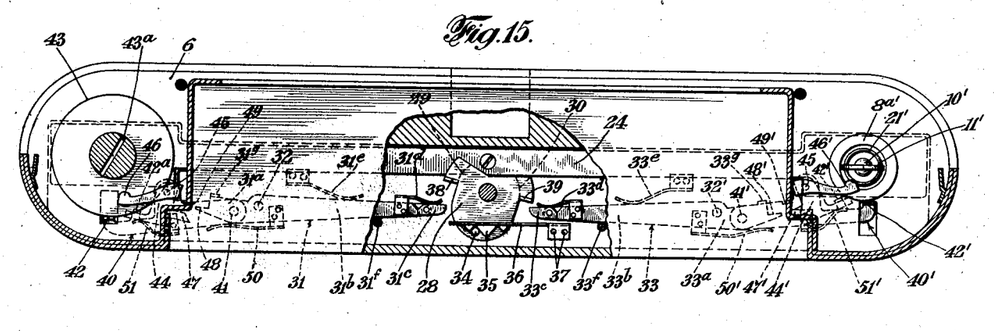
Fig. 15 is a view similar to Fig. 2, showing the right-hand spool station empty and showing the left-hand station occupied by an empty spool.

The action of the illustrated embodiment of my invention is as follows:

Assuming the camera to be empty, an empty spool is introduced into either of the spool stations, say, the left-hand station of Fig. 15, in the usual way by drawing back the stud 3 or 4 and the corresponding plate 11, introducing the spool, and then moving the said stud and plate inward to engage the spool. This introduction of the empty spool is only necessary the first time the camera is used and need never be repeated.

Figure 3:
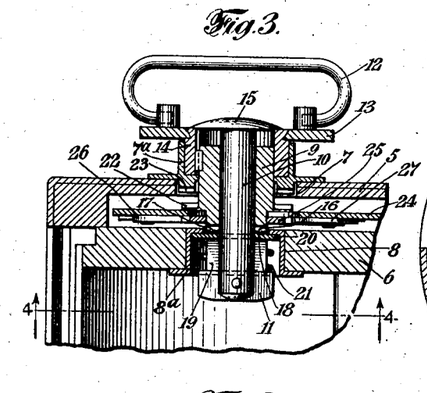
Fig. 3 is an enlarged vertical section of the film-winding handles of Fig. 1 with adjacent parts.
Figure 4:
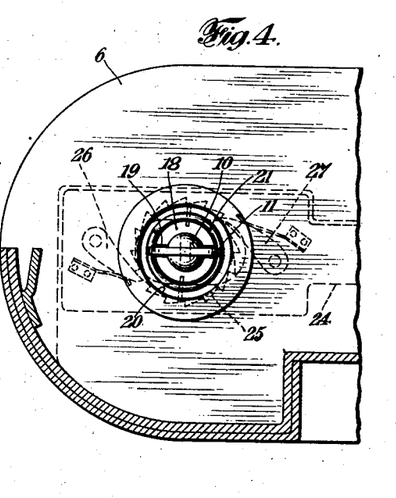
Figs. 4, 5, and 6 are other sectional views of the parts in Fig. 3 including one view of the parts in Fig. 3 with the plate that enters the slot in the spool raised, so that the spool can be removed.
Figure 9:
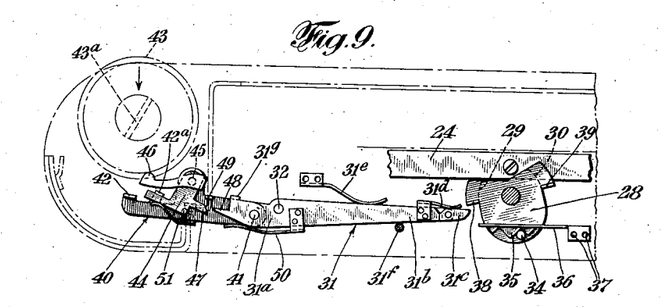
Figs. 9, 10, and 11 are views of the mechanism for detecting an empty spool, showing the different positions when a full spool is placed in the camera.
Figure 11:
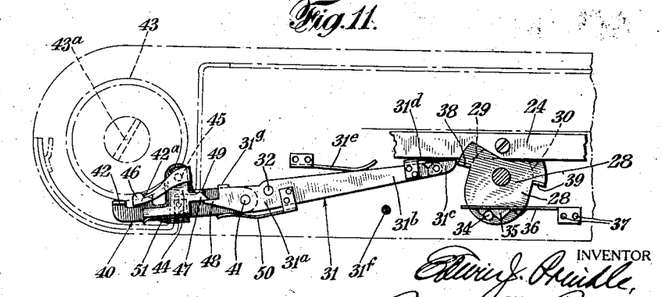
Figure 12:
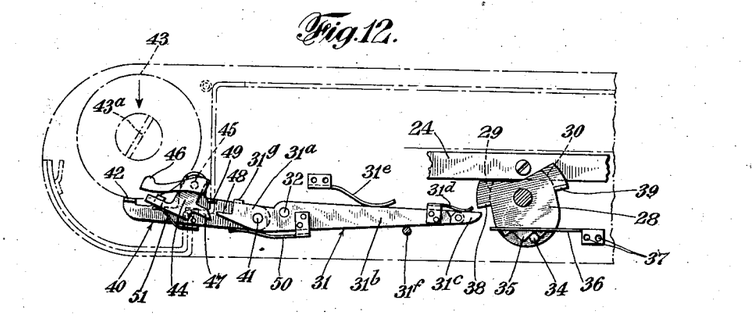
Figs. 12, 13 and 14 are views of the same mechanism showing provision for preventing the operation of the control mechanism by the formation of a roll of film as it is wound on the empty spool in using the camera.
Figure 16:
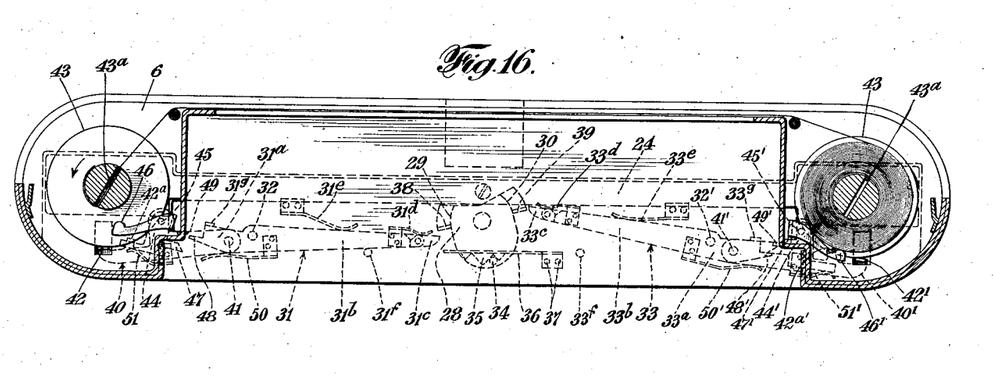
Fig 16 is a view similar to Fig. 15, but with a full spool introduced into the right-hand station.

Putting an empty spool in place has no effect on the interlocking mechanism because, having no film wound thereon, it cannot operate the trigger 44, which, as will be shown later, is a necessary prerequisite to any action of the interlocking mechanism. A spool having a roll of film wound thereon is then placed in the other spool station, say, the right-hand station of Fig. 15, and the end of this film is threaded into or otherwise attached to the empty spool, as shown in Fig. 16. In introducing the full spool into its station, first the film engages the toe 46' of the trigger 44', as shown in Fig. 9, the said toe being projected forward toward the spool, so that, as the spool advances into the station, the toe is carried backward to the position shown in Fig. 10 and the trigger is swung on its pivot so that its heel 47' is swung to position in front of the shoulder 48'. The finger 40' remains stationary in the position shown in Figs. 9 and 10 during this swinging of the trigger, because its spring 50' is stronger than the spring 51' of the trigger. The spool advances in the direction of the arrow in Fig. 10 until its flange 43' engages the lip 42' on the finger 40' when the said lip and finger travel backward with the spool. This causes the heel 47' of the trigger to engage the lug 48' on the lever arm 33ª and to move relatively toward the pin or shoulder 49, when further movement of the finger 40' will carry the lever arm 33ª backward, the finger, trigger, and lever moving as one part, as shown in Fig. 11. The backward movement of the outer end of the lever arm 33ª causes the opposite arm 33ᵇ to move forward, and causes its pivoted nose 31ᶜ to engage and carry forward the pin 39 on the disk 28. By this action the said disk is so rotated that its cam 29 will depress the left-hand end of the spring 24, and the said spring will move the inner sleeve 9 of the left-hand station downward (to the position in Fig. 1) so that its series of teeth 16 will engage the series of teeth 17 on the sleeve 18, thus unlocking the teeth 22 of the sleeve 9 from the teeth 23 on the cup-shaped part 7ª, so that the said sleeve can rotate, and at the same time locking the said sleeve to the sleeve 18 so that the plate 11 is rotatably connected. This action unlocks the said winding mechanism of the left-hand station so that it may be rotated in a direction to wind up the film, and at the same time rotatably locks the handle 12 with the plate 11 through the inner and outer sleeves 9 and 14 which are keyed together, and the sleeve 18 whose teeth 17 are meshed with the teeth 16 on the inner sleeve 9, as shown in Fig. 3.

Figure 1:
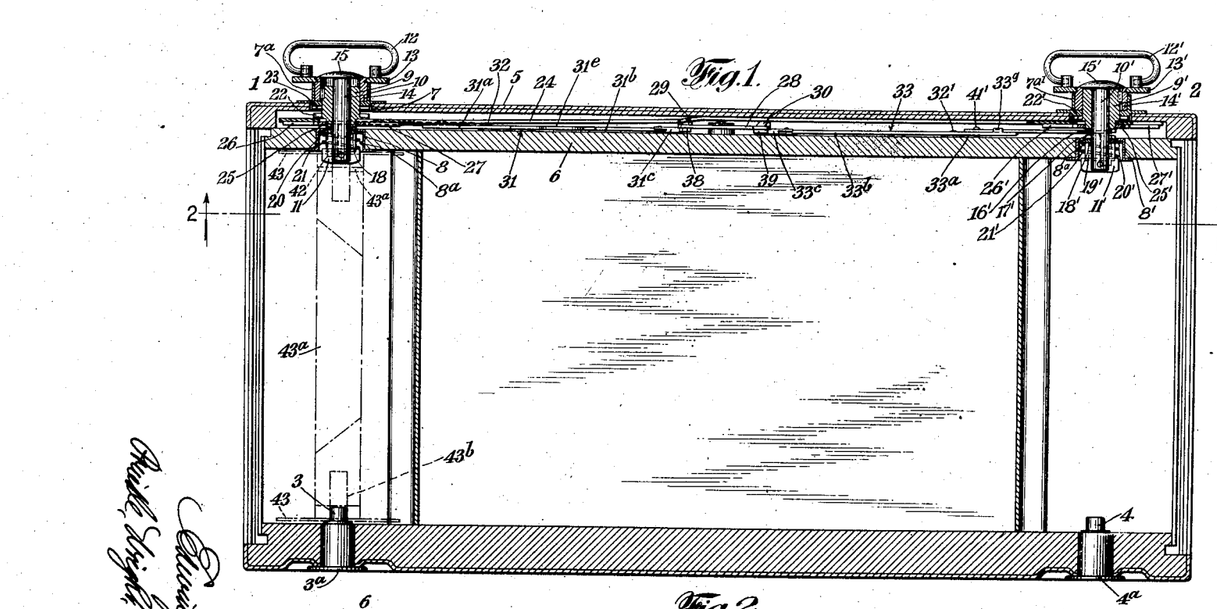
Fig. 1 is a vertical sectional view of the roll film holder of a camera embodying my invention, taken on line 1—1 of Fig. 2.
Figure 2:
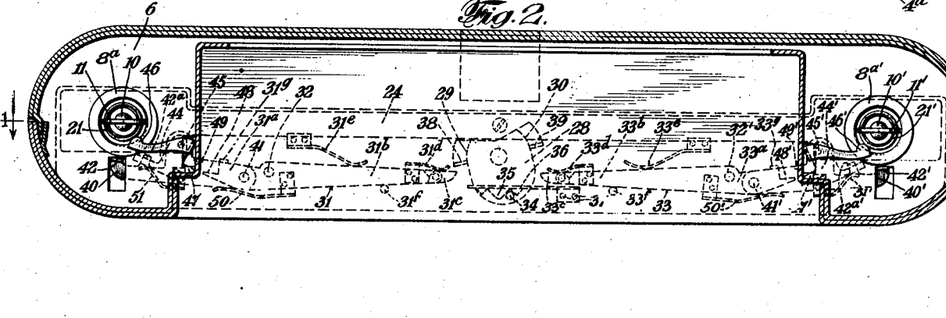
Fig. 2 is a sectional view taken on line 2—2 of Fig. 1, showing both spools removed.
Figure 5:
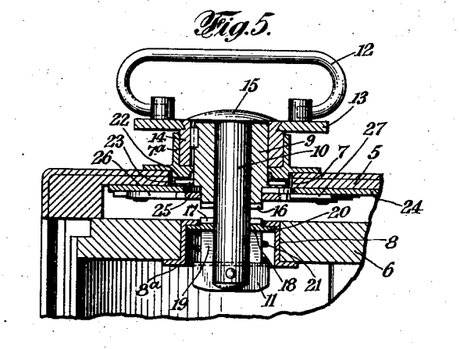
Figure 6:
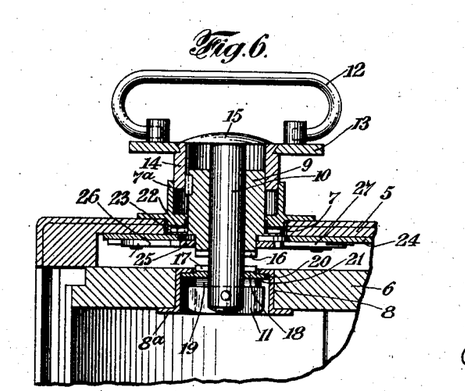
Figure 7:
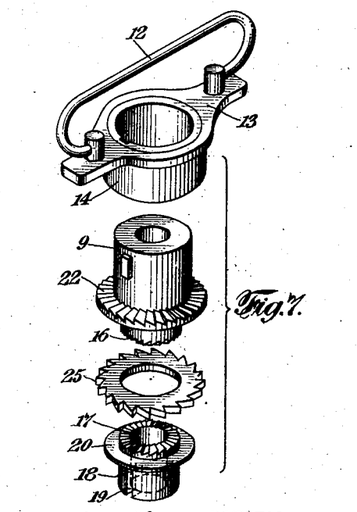
Fig. 7 is a perspective view of the parts shown in Fig. 3 in disassembled relation.
Figure 8:
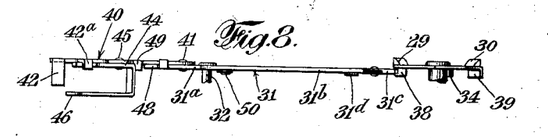
Fig. 8 is a side elevation of the parts for detecting an empty spool and preventing the mechanism for controlling the winding mechanism from being rendered inoperative thereby.

At the same time that the cam 29 on the disk depresses the left-hand end of the spring 24, the cam 30 on the said disk permits the right-hand end of the said spring to rise, and this action by raising the sleeve 9' of the right-hand station having the full spool therein, disconnects its teeth 16' from the teeth 17' of the lower sleeve 18', as shown in Figs. 1 and 5. Thus the plate 11' is disconnected from the handle and is free to rotate under the pull of the spool at the opposite station upon the film, while the teeth 22' of the sleeve 9' are engaged with the sleeve 23' on the cup-shaped part 7ª' and are locked from rotation thereby, so that the handle of the right-hand station cannot be rotated.

Thus, the introduction of a full spool into the right-hand station in Fig. 16 has resulted in locking the handle of that station from rotation while releasing its plate 11', as in Figs. 1 and 5, so that it may rotate in response to the pull of the winding mechanism at the other station.

Figure 17:
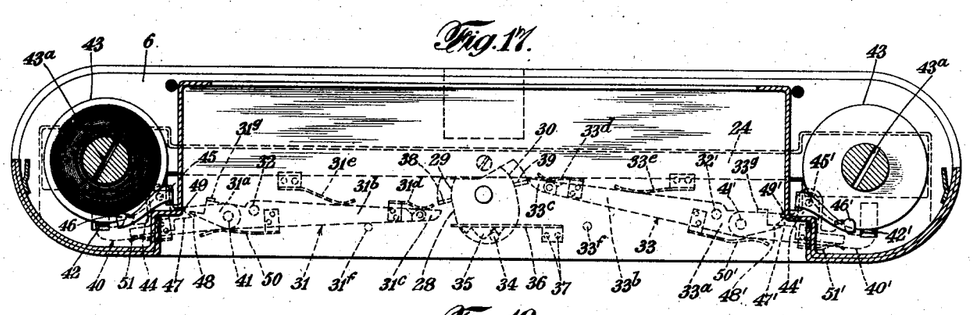
Fig. 17 is a view similar to Fig. 16, but with the film fully rolled up on the spool in the left-hand station.
Figure 18:
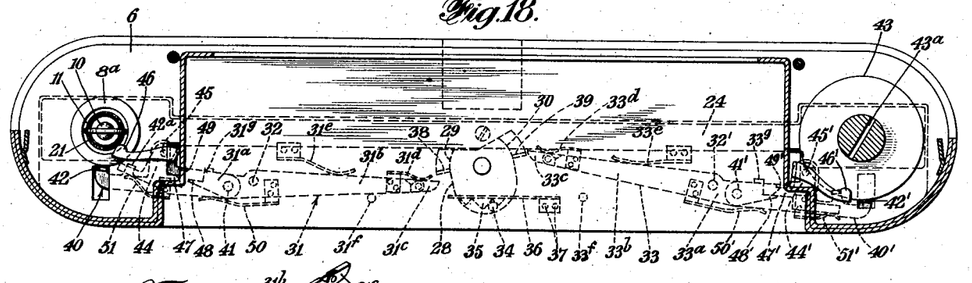
Fig. 18 is a view similar to Fig. 17, except that the full spool in the left-hand station has been removed so that said station is ready for a new full spool.

When the film has been entirely wound up on the left-hand spool, as shown in Fig. 17, and the camera is opened for reloading, it is only necessary to remove the spool from that station, as shown in Fig. 18, and to introduce a new full spool into the same station without, as is common practice at present, having to take the empty spool from the right-hand station and place it in the left-hand station. The act of introducing the new spool into the left-hand station results in moving its lever-arm 31ᵇ, so as to swing the disk in the opposite direction, which frees the handle of the right-hand station, so that it may be rotated, and couples it with the plate 11' so that, when rotated, it will carry the spool with it, while at the same time the handle at the left-hand station is rotatably disconnected from its plate 11 and is also locked from rotation. No mistake is possible, as only the proper handle can be rotated, and its pawls 26 and 27 permit it to be rotated only in the right direction. The film is put under tension by being wound up so that it is maintained flat and presents an optically correct surface upon which to throw the light image.

If there were an empty spool in the camera, and, instead of introducing a full spool into the opposite station, the user should introduce an empty spool into said station, the interlocking mechanism would not be thrown into an incorrect position, because, in order that either lever 31 or 33 may be operated at all, the corresponding trigger 44 must be engaged by film on the roll so as to swing its heel 47 into position to engage the shoulder 48 of that lever.

Figure 13:
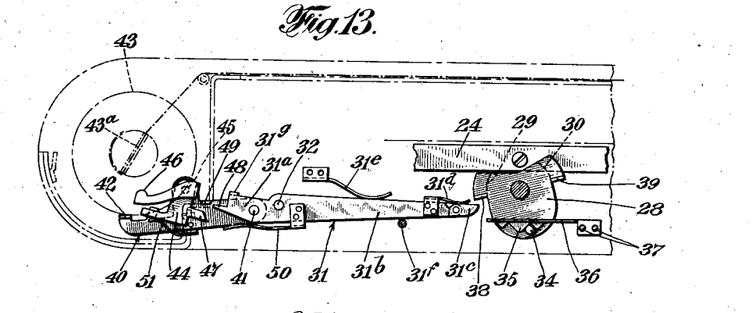
Figure 14:
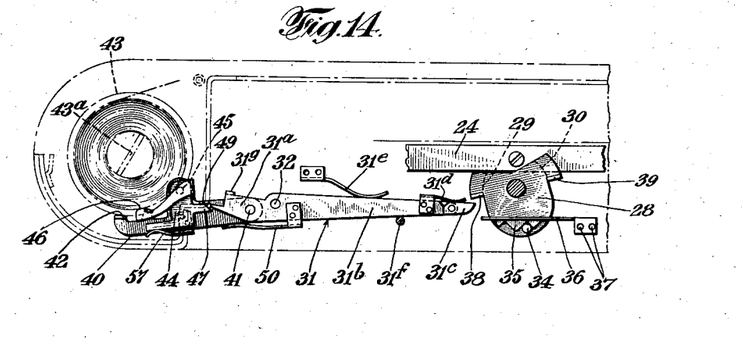

When film is rolled upon an empty spool, as in Fig. 13, the growing roll of film will engage the toe 46 of the corresponding trigger, as in Fig. 14, and swing the heel of the trigger toward the pivot of the finger 40. In order, however, that the heel may not strike against the end of the shoulder 48 and be prevented from further movement, and injury thus be done to the mechanism and film, the said shoulder is preferbaly made narrow, so that the said heel, owing to the fact that the finger 40 has been swung backward without carrying with it the lever arm 33ª, may move behind the shoulder and may avoid contact therewith, as shown in Figs. 14 and 17.

My invention will substantially simplify the reloading of the roll film holder or camera. This will not only make the camera of less trouble for a skilled user to manipulate, but, being entirely automatic, it will enable a beginner to take up the use of the camera much more easily.

My invention will also shorten the length of time required to reload the camera or film holder by at least one-third. This saving in time is very important on many occasions. When taking photographs from a moving object, as a train, a vessel, or an automobile, and especially of another moving object, as another vessel, if one wishes to make more than one exposure, and the first exposure proves to be the last one on a film, the shortened time of reloading made possible by my invention may make further exposures from different positions possible which would have been impossible if the longer time of ordinary reloading were required.

It is to be understood that where the term "full" is used with reference to a spool, the term means merely a spool having film wound therein as distinguished from an empty spool carrying no film.

While my invention affords these various substantial advantages, its operation is entirely automatic and the mechanism does not require the slightest attention from the user. It therefore does not divert the attention from nor add any complication to the use of the camera, which is already sufficiently complicated by need of attention to the focus, stop, distance, time of exposure, etc.

I claim:

1. A roll film holder for cameras having winding mechanisms at both spool stations and means for rendering one of said mechanisms operative and the other inoperative when a spool containing film is introduced into a spool station.

2. In a roll film holder for cameras, the combination of winding mechanism at both spool stations, means whereby one of said mechanisms is disconnected from its spool when the other of said mechanisms is rendered operative, and means whereby the handle of said first-mentioned mechanism is also thereby locked from turning.

3. In a roll film holder for cameras, the combination of winding mechanism at both spool stations and interlocking mechanism whereby upon the introduction of a roll of film into the holder, one of said winding mechanisms is rendered inoperative and the other operative, the parts being so constructed that the film is unwound from the full spool by tension of the film.

4. A roll film holder for cameras having winding mechanism at both spool stations and means whereby the introduction of a spool containing film into one station shall render the winding mechanism of that station inoperative.

5. A roll film holder for cameras having winding mechanism at both spool stations and means whereby the introduction of a full spool into one station shall render the winding mechanism of that station inoperative.

6. A roll film holder for cameras having winding mechanism at both spool stations and means whereby the introduction of a spool containing film into either station shall render inoperative the winding mechanism of that station and render operative the winding mechanism of the other station.

7. A roll film holder for cameras having winding mechanism at both spool stations and means whereby the introduction of a full spool into either station shall render inoperative the winding mechanism of that station and render operative the winding mechanism of the other station.

8. A roll film holder for cameras having winding mechanism at both spool stations, and means whereby the introduction of a full spool into one station shall render the winding mechanism of that station inoperative, said means comprising a part requiring to be preliminarily moved by contact with film on the spool.

9. In a roll film holder for cameras, the combination of winding mechanism at both spool stations, interlocking mechanism whereby when one of said winding mechanisms is thrown into operative position, the other such mechanism is thrown into inoperative position, and means adapted to be engaged by the film on the spool last inserted for actuating said interlocking mechanism.

10. A roll film holder for cameras having winding mechanism at both spool stations and means whereby the introduction of a full spool into either station shall render inoperative the winding mechanism of that station and render operative the winding mechanism of the other station, said means comprising a part requiring to be preliminarily moved by contact with film on the spool.

11. A roll film holder for cameras having winding mechanism at both spool stations, means whereby the introduction of a spool containing film into one station shall render the winding mechanism of that station inoperative leaving said spool free to turn under tension on the film alone, and shall render the winding mechanism of the other station operative.

12. A roll film holder for cameras having winding mechanism at both spool stations, means whereby the introduction of a full spool into one station shall render the winding mechanism of that station inoperative leaving said spool free to turn under tension on the film alone, and shall render the winding mechanism of the other station operative.

13. A roll film holder for cameras having winding mechanism at both spool stations and means whereby the introduction of a spool containing film into one of said stations shall render the winding mechanism of said station inoperative and shall render the winding mechanism of the other station operative, said means being incapable of operation by an empty spool.

14. A roll film holder for cameras having winding mechanism at both spool stations and means whereby the introduction of a full spool into one of said stations shall render the winding mechanism of said station inoperative and shall render the winding mechanism of the other station operative, said means being incapable of operation by an empty spool.

15. A roll film holder for cameras having winding mechanism at both spool stations, means actuated by the introduction of a spool containing film for rendering one of said mechanisms inoperative when the other is thrown into operative position, said means being so constructed as not to be actuated by the winding of film upon an empty spool after it has been introduced into position in the holder.

16. A roll film holder for cameras having winding mechanism at both spool stations, means actuated by the introduction of a full spool for rendering one of said mechanisms inoperative when the other is thrown into operative position, said means being so constructed as not to be actuated by the winding of film upon an empty spool after it has been introduced into position in the holder.

17. In a roll film holder for cameras, the combination of winding mechanism at both spool stations, interlocking mechanism whereby when one of said winding mechanisms is thrown into operative position, the other such mechanism is thrown into inoperative position, means adapted to be engaged by a spool for actuating said interlocking mechanism, and means adapted to be engaged by the film on the spool for connecting said last-mentioned means with said interlocking mechanism.

18. In a roll film holder for cameras, the combination of winding mechanism at both spool stations, interlocking mechanism whereby when one of said winding mechanisms is thrown into operative position, the other such mechanism is thrown in to inoperative position, means adapted to be engaged by the spool for actuating said interlocking mechanism, and a trigger device adapted, by contact with the film on the spool, to connect said last-mentioned means with said interlocking mechanism.

19. In a roll film holder for cameras, the combination of winding mechanism at both spool stations, means whereby the introduction of a full spool causes one of said mechanisms to be disconnected from its spool and its handle to be locked from turning and causes the other of said mechanisms to be rendered operative, and means whereby the handle of said last mentioned mechanism is prevented from turning backward.

20. In a roll film holder for cameras, the combination of winding mechanism at both spool stations and means whereby the introduction of a full spool shall lock and render inoperative the winding handle at that spool station and shall put the winding handle at the other station into operative condition.

21. In a roll film holder for cameras, the combination of winding mechanism at both spool stations means whereby the introduction of a full spool shall lock and render inoperative the winding handle at that spool station and shall put the winding handle at the other station into operative condition, and means for preventing movement of said last-mentioned handle backward.

22. In a roll film holder for cameras, winding mechanism for a spool comprising a part adapted to engage and rotate a spool, a handle for rotating said part, said handle being so connected to said part as to be capable of rotation independent thereof, and means for rotatively connecting said parts.

23. In a roll film holder for cameras, winding mechanism for a spool comprising a part adapted to engage and rotate a spool, a handle for rotating said part, said handle being so connected to said part as to be capable of rotation independent thereof, and means adapted in one position to rotatively connect said handle and said part and in another position to disconnect said parts and to lock said handle from rotation.

24. In a roll film holder for cameras, winding mechanism for a spool, comprising a part adapted to engage and rotate a spool, a handle for rotating said part, said handle being so connected to said part as to be capable of rotation independent thereof, means for rotatively connecting said parts, and a connection between said handle and said part whereby movement of said handle can withdraw said part from engagement with the spool without disturbing the means for rotatively connecting said handle and part.

25. In a roll film holder for cameras, winding mechanism for a spool comprising a part adapted to engage and rotate a spool, a handle for rotating said part, said handle being so connected to said part as to be capable of rotation independent thereof, means adapted in one position to rotatively connect said handle and said part and in another position to disconnect said parts to lock said handle from rotation, and a connection between said handle and said part whereby movement of said handle can withdraw said part from engagement with the spool without disturbing the means for rotatively connecting said handle and part.

26. In a roll film holder for cameras, a winding mechanism comprising a handle, a part adapted to engage a spool for rotating the same, a stem upon which said part is mounted, two clutch members mounted on said stem, one of said members being rotatively engaged with said spool-engaging part and the other of said members being rotatively engaged with said handle.

27. In a roll film holder for cameras, winding mechanism for a spool comprising a part adapted to engage and rotate the spool, a handle for turning said part, a stem connecting said part and said handle, clutch members mounted on said stem, one of said clutch members being vertically, slidably mounted relative to said spool-winding part, and the other of said clutch members being similarly mounted relative to said handle, means for shifting said clutch members to engage and disengage them, and means for locking from rotation that clutch member which is connected with the handle when said clutch member is in unclutched position.

28. In a roll film holder for cameras, winding mechanism for a spool comprising a part adapted to engage and rotate the spool, a handle for turning said part, a stem connecting said part and said handle, clutch members mounted on said stem, one of said clutch members being vertically, slidably mounted relative to said spool-winding part, and the other of said clutch members being similarly mounted relative to said handle, means for shifting said clutch members to engage and disengage them, means for locking from rotation that clutch member which is connected with the handle when said clutch member is in unclutched position, and means for preventing said handle from rotating backward.

29. In a roll film holder for cameras, the combination of a part adapted to engage a spool for winding the same, a handle for rotating said part, a stem upon which said part is mounted, said stem having a head or shoulder that rotatively engages said handle, so that said stem may be moved longitudinally by said handle, clutch sleeves mounted upon said stem, said sleeves being slidably, but non-rotatively, connected, respectively, with said spool-rotating part and with said handle, teeth on said last-mentioned sleeve, and a tooth on the frame of the film holder, in such relation that when said clutch member is in disconnected relation said tooth shall be in engagement with said teeth and lock said handle from rotation.

30. In a roll film holder for cameras, the combination of a part adapted to engage a spool for winding the same, a handle for rotating said part, a stem upon which said part is mounted, said stem having a head or shoulder that rotatively engages said handle, so that said stem may be moved longitudinally by said handle, clutch sleeves slidably mounted upon said stem, said sleeves being slidably, but non-rotatably, connected, respectively, with said spool rotating part and with said handle, teeth on said last-mentioned sleeve, a tooth on the frame of the film holder, in such relation that when said clutch member is in disconnected relation said tooth shall be in engagement and lock said handle from rotation, and means for shifting said last-mentioned clutch member, said member having ratchet teeth and said means having a pawl or pawls for engagement therewith.

31. In a roll film holder for cameras, the combination of winding mechanism at both stations, said winding mechanisms having means whereby their handles may be rotatively disconnected from the spool-engaging part, a part having cams for disengaging one of said handles while engaging the other thereof, and means operated by the introduction of a spool containing film into one of said stations for so shifting said part as to disengage the handle of the station having the spool and engage the handle of the opposite station.

32. In a roll film holder for cameras, the combination of winding mechanism at both stations, said winding mechanisms having means whereby their handles may be rotatively disconnected from the spool-engaging part, a part having cams for disengaging one of said handles while engaging the other thereof, and means operated by the introduction of a full spool into one of said stations for so shifting said part as to disengage the handle of the station having the full spool and engage the handle of the opposite station.

33. In a roll film holder for cameras, the combination of winding mechanism at both stations, said winding mechanisms having means whereby their handles may be rotatively disconnected from the spool-engaging part, a part having cams for disengaging one of said handles while engaging the other thereof, and means operated by the introduction of a spool containing film into one of said stations for so shifting said part as to disengage the handle of the station having the spool and engage the handle of the opposite station, said means comprising a lever having a finger adapted to be engaged and moved by the spool being introduced, and said cam-bearing member having a pin or shoulder that is adapted to be moved by said lever when so moved by the spool.

34. In a roll film holder for cameras, the combination of winding mechanism at both stations, said winding mechanisms having means whereby their handles may be rotatively disconnected from the spool-engaging part, a part having cams for disengaging one of said handles while engaging the other thereof, and means operated by the introduction of a full spool into one of said stations for so shifting said part as to disengage the handle of the station having the full spool and engage the handle of the opposite station, said means comprising a lever having a finger adapted to be engaged and moved by the spool being introduced, and said cam-bearing member having a pin or shoulder that is adapted to be moved by said lever when so moved by the spool.

35. In a roll film holder for cameras, the combination of winding mechanism at both stations, said winding mechanisms having means whereby their handles may be rotatively disconnected from the spool-engaging part, a part having cams for disengaging one of said handles while engaging the other thereof, and means operated by the introduction of a spool containing film into one of said stations for so shifting said part as to disengage the handle of the station having the spool and engage the handle of the opposite station, said means comprising a lever having a finger adapted to be engaged and moved by the spool being introduced, said cam-bearing member having a pin or shoulder that is adapted to be moved by said lever when so moved by the spool, and said lever having a part capable of yielding in passing said pin or shoulder in returning to normal position.

36. In a roll film holder for cameras, the combination of winding mechanism at both stations, said winding mechanisms having means whereby their handles may be rotatively disconnected from the spool-engaging part, a part having cams for disengaging one of said handles while engaging the other thereof, and means operated by the introduction of a full spool into one of said stations for so shifting said part as to disengage the handle of the station having the full spool and engage the handle of the opposite station, said means comprising a lever having a finger adapted to be engaged and moved by the spool being introduced, said cam-bearing member having a pin or shoulder that is adapted to be moved by said lever when so moved by the spool, and said lever having a part capable of yielding in passing said pin or shoulder in returning to normal position.

37. In a roll film holder for cameras, the combination of winding mechanism at both stations, said winding mechanisms having means whereby their handles may be rotatively disconnected from the spool-engaging part, a part having cams for disengaging one of said handles while engaging the other thereof, and means operated by the introduction of a full spool into one of said stations for so shifting said part as to disengage the handle of the station having the full spool and engage the handle of the opposite station, said means comprising a lever having a finger adapted to be engaged and moved by the spool being introduced, said cam-bearing member having a pin or shoulder that is adapted to be moved by said lever when so moved by the spool, and said finger being adapted to be engaged by the flange of the spool and having a trigger that is adapted to be preliminarily engaged by the film on the spool and to lock said finger and lever together.

38. In a roll film holder for cameras, the combination of winding mechanism at both stations, said winding mechanisms having means whereby their handles may be rotatively disconnected from the spool-engaging part, a part having cams for disengaging one of said handles while engaging the other thereof, and means operated by the introduction of a full spool into one of said stations for so shifting said part as to disengage the handle of the station having the full spool and engage the handle of the opposite station, said means comprising a lever having a finger adapted to be engaged and moved by the spool being introduced, said cam-bearing member having a pin or shoulder that is adapted to be moved by said lever when so moved by the spool, and said finger being adapted to be engaged by the flange of the spool and having a trigger that is adapted to be preliminarily engaged by the film on the spool and to lock said finger and lever together, said finger and trigger being provided with springs tending to throw them toward the incoming spool, the spring for the finger being stronger than the spring for the trigger.

39. In a roll film holder for cameras, the combination of winding mechanism at both stations, said winding mechanisms having means whereby their handles may be rotatively disconnected from the spool-engaging part, a part having cams for disengaging one of said handles while engaging the other thereof, and means operated by the introduction of a full spool into one of said stations for so shifting said part as to disengage the handle of the station having the full spool and engage the handle of the opposite station, said means comprising a lever having a finger adapted to be engaged and moved by the spool being introduced, said cam-bearing member having a pin or shoulder that is adapted to be moved by said lever when so moved by the spool, and said finger being adapted to be engaged by the flange of the spool and having a trigger that is adapted to be preliminarily engaged by the film on the spool and to lock said finger and lever together, said finger and trigger being provided with springs tending to throw them toward the incoming spool, the spring for the finger being stronger than the spring for the trigger, and said lever having a spring tending to throw its finger-bearing arm toward the spool, the spring of said lever being stronger than the spring of said finger.

40. In a roll film holder for cameras, the combination of winding mechanism at both stations, said winding mechanisms having means whereby their handles may be rotatively disconnected from the spool-engaging part, a part having cams for disengaging one of said handles while engaging the other thereof, and having pins or shoulders for shifting it, and means operated by the introduction of a spool containing film into one of said stations for so shifting said part, said means comprising a lever adapted to engage one of said pins or shoulders and having a finger adapted to be engaged and moved by the spool being introduced, said cam-bearing part having a pin or shoulder, and a yielding projection or hump in such relation to said pin or shoulder as to be depressed by movement of said part under the action of said lever during the early part of the movement of said lever, and then to throw said part in the direction of movement caused by said lever, but sufficiently beyond said lever to carry said first-mentioned pin or shoulder out of contact with said lever.

41. In a roll film holder for cameras, the combination of winding mechanism at both stations, said winding mechanisms having means whereby their handles may be rotatively disconnected from the spool-engaging part, a part having cams for disengaging one of said handles while engaging the other thereof, and having pins or shoulders for shifting it, and means operated by the introduction of a full spool into one of said stations for so shifting said part, said means comprising a lever adapted to engage one of said pins or shoulders and having a finger adapted to be engaged and moved by the spool being introduced, said cam-bearing part having a pin or shoulder, and a yielding projection or hump in such relation to said pin or shoulder as to be depressed by movement of said part under the action of said lever during the early part of the movement of said lever, and then to throw said part in the direction of movement caused by said lever, but sufficiently beyond said lever to carry said first-mentioned pin or shoulder out of contact with said lever.

42. In a roll film holder for cameras, the combination of winding mechanism at both spool stations, means whereby the introduction of a full spool disconnects one of said mechanisms from its spool and connects the other of said mechanisms with its spool, said means comprising a lever having a finger pivoted thereto, which finger is adapted to engage a flange of the spool, said finger carrying a trigger that is adapted to engage the film on said spool and to throw its heel toward the pivot of said finger sufficiently to engage a shoulder on said lever, said trigger projecting sufficiently toward the spool to contact with the film before the finger contacts with said flange, and springs for holding said parts in said relation.

43. In a roll film holder for cameras, the combination of winding mechanism at both spool stations, means whereby the introduction of a full spool disconnects one of said mechanisms from its spool and connects the other of said mechanisms with its spool, said means comprising a lever having a finger pivoted thereto, which finger is adapted to engage a flange of the spool, said finger carrying a trigger that is adapted to engage the film on said spool and to throw its heel toward the pivot of said finger sufficiently to engage a shoulder on said lever, said trigger projecting sufficiently toward the spool to contact with the film before the finger contacts with said flange, springs tending to hold said parts in said relation, and a stop or shoulder on said finger against which the heel of said trigger may rest when said trigger is in its backward position.

44. In a roll film holder for cameras, the combination of winding mechanism at both spool stations, means whereby the introduction of a full spool disconnects one of said mechanisms from its spool and connects the other of said mechanisms with its spool, said means comprising a lever having a finger pivoted thereto, which finger is adapted to engage a flange of the spool, said finger carrying a trigger that is adapted to engage the film on said spool and to throw its heel toward the pivot of said finger sufficiently to engage a shoulder on said lever, said trigger projecting sufficiently toward the spool to contact with the film before the finger contacts with said flange, and springs tending to hold said parts in said relation, the shoulder on said lever and the heel of said trigger being so proportioned that if said finger be swung on its pivot before said trigger is moved, subsequent movement of said trigger cannot cause its heel to strike against said shoulder.

45. In a roll film holder for cameras, the combination of winding mechanism at both spool stations, means whereby the introduction of a full spool disconnects one of said mechanisms from its spool and connects the other of said mechanisms with its spool, said means comprising a lever having a finger pivoted thereto, which finger is adapted to engage a flange of the spool, said finger carrying a trigger that is adapted to engage the film on said spool and to throw its heel toward the pivot of said finger sufficiently to engage a shoulder on said lever, said trigger projecting sufficiently toward the spool to contact with the film before the finger contacts with said flange, springs tending to hold said parts in said relation, and a stop or shoulder on said finger against which the heel of said trigger may rest when said trigger is in its backward position, the shoulder on said lever and the heel of said trigger being so proportioned that if said finger be swung on its pivot before said trigger is moved, subsequent movement of said trigger cannot cause its heel to strike against said shoulder.

In testimony that I claim the foregoing, I have hereunto set my hand this 1st day of February, 1924.

EDWIN J. PRINDLE.